Sept. 15, 1925.
C. G. HULTMAN
FLEXIBLE BRACELET
Filed Oct. 20, 1922
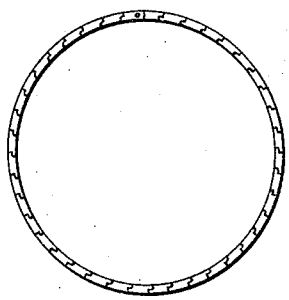
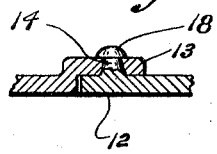
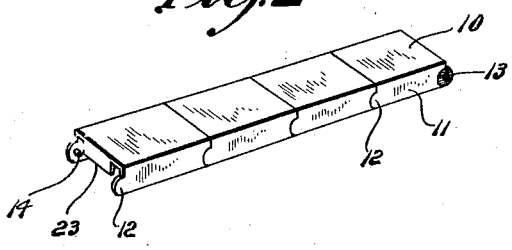
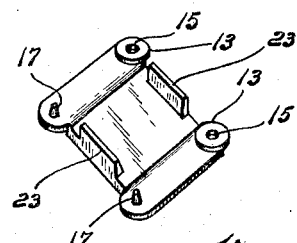
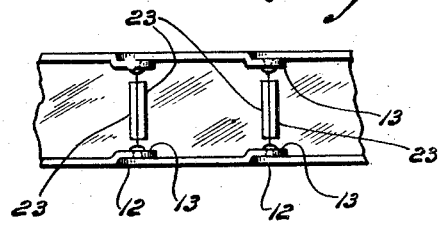
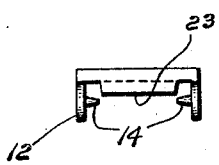
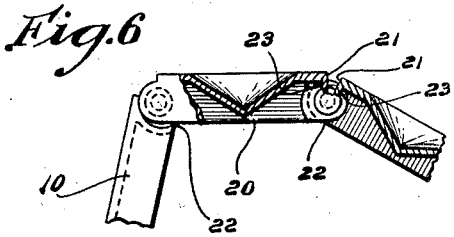
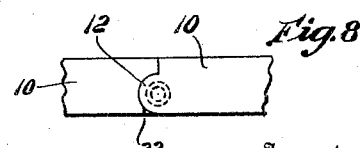
Inventor
Charles G. Hultman
By Howard E. Barlow
Attorney Patented Sept. 15, 1925.

1,554,095

UNITED STATES PATENT OFFICE.

CHARLES G. HULTMAN, OF PROVIDENCE, RHODE ISLAND.

FLEXIBLE BRACELET.

Application filed October 20, 1922. Serial No. 595,798.

*To all whom it may concern:*

Be it known that I, CHARLES G. HULTMAN, a citizen of the United States, residing at Providence, in the county of Providence and State of Rhode Island, have invented certain new and useful Improvements in Flexible Bracelets, of which the following is a specification.

This invention relates to flexible bracelets or chains of the type adapted to be used as a wrist ornament or for other uses, and the primary object of this invention is to provide a bracelet of this character comprising a plurality of link members in which the side walls of the links are pivotally connected together.

With these and other objects in view, the invention consists of certain novel features of construction, as will be more fully described, and particularly pointed out in the appended claims.

In the accompanying drawings:

Figure 1 is an edge of my improved bracelet.

Figure 2 is a perspective view showing a plurality of bracelet links connected together.

Figure 3 is an enlarged perspective view showing the under side of one of my bracelet links with the side walls extended to provide pivot ears.

Figure 4 is a view of the under side of the links illustrating the manner of connecting them together.

Figure 5 is an end view of one of the links showing the pivots before being riveted.

Figure 6 is a view of a modified construction partly in section showing the plurality of gem-setting links connected together and partly in section to illustrate the connection at the joints.

Figure 7 is a greatly enlarged section showing the integral rivet in the ear of one member as extending through the opening in the recessed portion of the opposite member and having its end headed over to securely lock the members together.

Figure 8 is a side elevation showing the joint between two links when the links are in alignment.

It is found in practice in the construction of bracelets of this character of advantage to provide each link with inwardly-extending side walls having extending ears pivotally connected together, and to provide means whereby the ends of the pivots may be riveted over to securely lock the links together; also to set the pivoting ears so that their circular, lower portions will be tangent to the lower edge of the side wall to which they are attached to permit flexing the links of the bracelet and third, it is found of advantage to provide end walls on the body portion of the links so that when the links are bent at an angle to each other these end walls will shut off the view to the unfinished inner or under portion of the link, and the following is a detailed description of one means by which these results may be accomplished:—

With reference to the drawings, 10 designates the body portion of a link, which is provided with inwardly-turned side walls 11, one end of each side wall being provided with an extending pivoting ear 12 while the opposite end of each of these walls is provided with an extending pivoting ear 13 inset from the plane of the side wall a distance substantially equal to the thickness of the ear 12 formed to engage it, thus providing a pivoting seat through which the links are connected by means of pivots 14 preferably formed integral with and extending from the inner face of each of the ears 12 through corresponding openings 15 in the opposite inset ears 13 and these pivot pins are preferably formed of sufficient length so that after having been passed through the openings in the opposite ears they may be riveted over as at 18, best shown in Figures 4 and 7, for pivotally locking the links together to prevent them from spreading.

It will be noted that the lower edge of each of these rounded, pivot ears 12 and 13 is tangent or substantially tangent with the lower edge 20 of their side walls, and that the center of the pivoting pin is preferably formed in substantial alignment with the abutting ends 21 of the adjacent links, the stock at the under side of the recessed portion as at 22 being slightly cut away when it is desired to permit a comparatively wide movement or flexing action to the links.

It is found in practice that where a plurality of these links are employed as a bracelet where they normally stand at an angle to each other, to be of advantage to partially close the opening between the links due to their inclination to each other, by forming an end wall 23 extending downwardly at each end from the face of the top plate thereof so as to prevent a view of the interior or unfinished under side of the link through the space opened at the joint.

My improved bracelet is simple and practical in construction and effective in its operation and by forming the same by my improved construction the bracelet is very flexible and has many practical advantages, as above described, over others of this character.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A flexible bracelet comprising a plurality of links each having a body portion with inwardly turned side walls, each of said side walls having a projecting pivotal ear at one end, the extremity of each ear being rounded on the arc of a circle substantially tangent to the inner edge of its side wall, the opposite end of each of said walls having a portion offset inwardly to receive the said ears on the next adjacent link, and an integral pivot pin on each ear extending inwardly through said offset portion and headed over on the inside thereof.

2. A flexible bracelet comprising a plurality of sheet metal links, each having a top plate with inwardly-turned side wall portions and a projecting pivotal ear at one end of each side wall portion, said top plate also having inwardly-folded space closing end wall portions, the opposite ends of said side wall portions having portions offset inwardly to receive the said ears on the next adjacent link, and pivotal means for connecting said links together.

3. A flexible bracelet comprising a plurality of links each having a body portion with inwardly-turned side and end walls, said side walls each having a projecting pivotal ear at one end the extremity of each ear being rounded on the arc of a circle substantially tangent to the inner edge of its wall, the opposite end of each of said walls having a portion offset inwardly to receive the side ears on the next adjacent link, a pivot pin on each ear extending through an opening in the offset portion of the next link to pivotally connect the links together, and the end of each pivot being provided with an enlarged head to lock the pivoted parts together.

4. A bracelet of the character described comprising a plurality of links substantially U-shaped in cross section, the side walls of said links being formed with an outwardly extending lug portion at one end thereof, said lug portions and side walls having openings and integral shaft portions, the said integral shaft portions being arranged to be received in the opening of adjacent links when said links are engaged one with another.

In testimony whereof I affix my signature.

CHARLES G. HULTMAN.